Nov. 19, 1963 R. E. MUNZ ETAL 3,111,166
PORTABLE HEATING AND COOLING APPLIANCE
Filed April 13, 1961

*INVENTORS*
ROBERT E. MUNZ
& LAWRENCE R. COLLINS
BY
THEIR ATTORNEY

United States Patent Office 3,111,166
Patented Nov. 19, 1963

3,111,166
PORTABLE HEATING AND COOLING APPLIANCE
Robert E. Munz, Jeffersontown, and Lawrence R. Collins, Louisville, Ky., assignors to General Electric Company, a corporation of New York
Filed Apr. 13, 1961, Ser. No. 102,852
2 Claims. (Cl. 165—30)

The present invention relates to a portable heating and cooling appliance and is more particularly concerned with the transportable appliance of light weight and compact construction.

More specifically, the invention is concerned with, and has as its principal object the provision of, a portable appliance including a refrigerated compartment cooled by thermoelectric refrigeration and an electrical heating means in a novel and compact arrangement.

In accordance with the present invention, there is provided a portable heating and cooling appliance comprising insulated walls defining a refrigerated storage compartment having an access opening at the front thereof and an insulated door for closing that opening. A plurality of thermoelectric elements arranged in the walls of the compartment provide a plurality of cold junctions in heat exchange relationship with the compartment for cooling of the contents thereof and a plurality of hot junctions in heat dissipating relationship with the outer surfaces of the appliance for dissipating the heat removed from the compartment. The appliance also includes a power supply compartment arranged below the storage compartment for housing the usual rectifier and other means required for the operation of a thermoelectric cooling device from an A.C. source. The rear wall of the storage compartment is provided with a recess in which there is pivotally supported electrical heating means which are normally disposed within the recess but which can be opened or dropped to a horizontal position for supporting and warming foodstuffs and the like.

Various advantages and additional features of the invention will become apparent from the following description of the invention in which reference is made to the accompanying drawings wherein.

Figure 1:
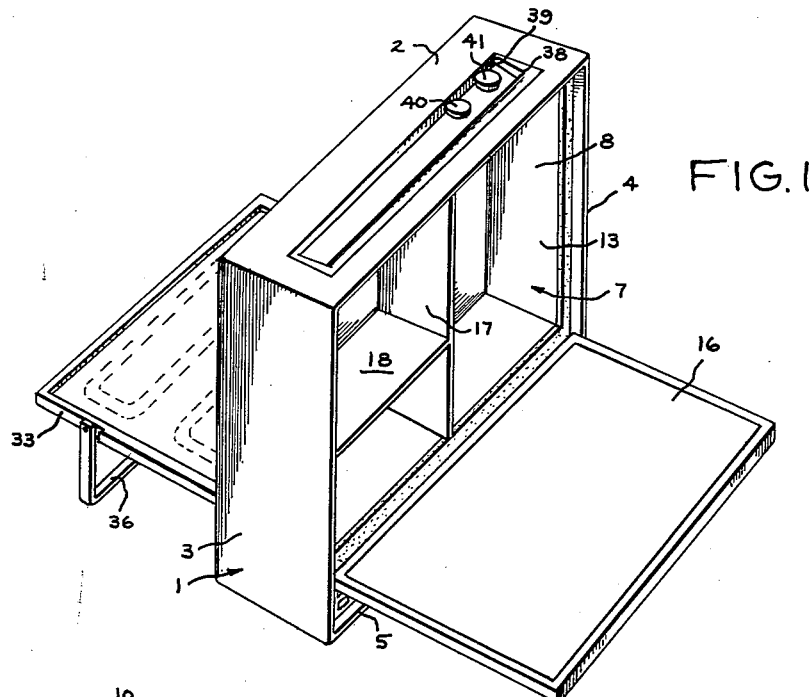
FIG. 1 is a perspective view of the appliance of the present invention.

With reference to FIG. 1 of the drawing there is shown an embodiment of the present invention comprising an outer case or frame 1 formed of sheet metal or the like folded to rectangular form to provide the exterior top wall 2, side walls 3 and 4 and bottom wall 5 of the appliance. A cooling or refrigerating compartment 7 supported within the casing 1 is provided for the storage of refrigerated foodstuffs and the like. This compartment preferably comprises a liner of plastic or resinous material 8, surrounded by suitable foamed resin heat insulation 10, to form the insulated top wall 12, side walls 13 and bottom wall 14 and rear wall 15 of the storage compartment. The access opening at the front of this compartment is closed by an insulated drop door structure 16 which is preferably also composed of a plastic material of good heat insulating properties. A partition 17 and one or more shelves 18 may be provided within the compartment 7.

For the purpose of maintaining the contents of the compartment 7 at refrigerated temperatures, there are provided a plurality of thermoelectric elements 20. These elements are of the well known type comprising two materials having dissimilar thermomotive properties and serially connected by means of junction straps 21 and 22 to provide, in accordance with the well known Peltier principle, a plurality of cold junctions represented by the straps 21 and a plurality of heat dissipating junctions represented by the straps 22. When a direct current is passed through the elements, heat is absorbed by the straps 21 in heat exchange relationship with the liner 8 and dissipated by the straps 22.

Preferably the appliance is manufactured by arranging the plastic liner 8 and the outer metal frame 1 in a suitable mold (not shown) in such a manner that the liner 8 is in spaced relationship with the casing 1. The thermoelectric elements 20 are then arranged between the liner 8 and the case 1 about the top, bottom and side walls of the liner 8 so that they can be completely embedded in a mass of resinous foam insulating material 12 produced by the well known process which comprises introducing into the space between the liner 8 and the casing 1 a mass of fluid foam-forming resinous material which during curing expands to form a cellular insulation that provides not only the required heat insulation between the compartment 7 and the casing 1 but also firmly anchors the thermoelectric elements in their proper positions relative to the casing 1 and the liner 8. It will also be understood of course that, in accordance with the usual practices, the outer or heat dissipating straps 22 of the thermoelectric elements are suitably electrically insulated from the metallic case 1 by means of a thin film of resin or the like (not shown).

Figure 2:
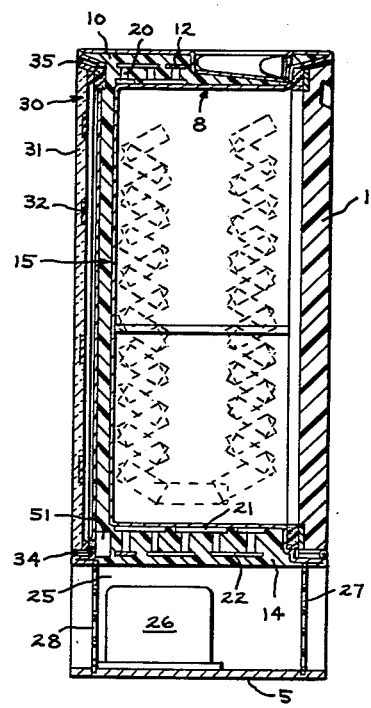
FIG. 2 is a vertical sectional view of the appliance shown in FIG. 1.

As is shown more clearly in FIG. 2 of the drawing, the insulated compartment 7 occupies only a portion of the total space within the casing 1. More specifically, the bottom wall 14 of the insulated compartment is spaced from the bottom wall 5 of the casing to provide a power supply compartment 25 in the lower portion of the appliance. This compartment 25 houses an electrical means 26 for converting alternating electric current from an ordinary household supply system to the low voltage direct current required for the operation of the thermoelectric elements 20. For the purpose of cooling this D.C. power supply 26 and the heat dissipating straps 22 arranged in the lower wall 14 of the storage compartment, grilles 27 and 28 are provided in the front and rear walls of the power supply compartment 25 to permit the circulation of air through that compartment.

The appliance also includes means for heating or warming foods or beverages. This heating means generally indicated by the numeral 30 preferably comprises an element composed of heat and electrically insulating material 31 such as glass or the like having embedded in one surface thereof a resistance heating means 32. The heating element 31 is supported in a frame 33 of about the same size and dimensions as door 16, which frame is supported by means of a hinge 34 along its lower edge so that it is normally supported in a recess 35 provided in the rear wall 15 of the appliance and having about the same size and dimensions as the access opening to the refrigerated compartment. The heating means is further provided with a pivoted leg or support 36 which as is shown in FIG. 1 of the drawing supports the element in its open or horizontal position.

A handle 38 pivotally supported within a recess 39 in the top wall 2 of the appliance provides means for carrying the appliance from one point to another. This recess 39 is also employed to protect the recessed control knobs 40 and 41 for respectively operating switches 42 and 43.

Figure 3:
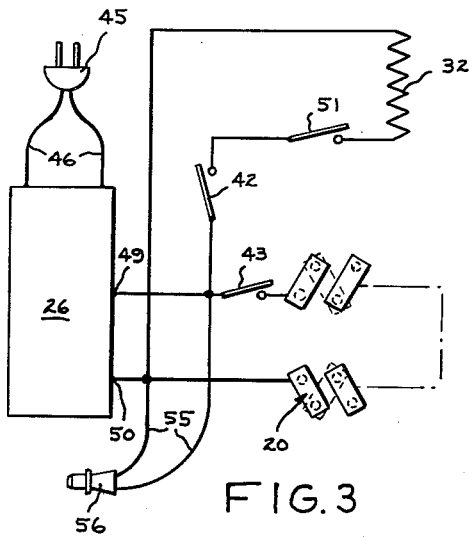
FIG. 3 is a wiring diagram illustrating one form of control and energizing circuitry for the appliance.

The power supply and control circuitry employed for energizing the heating means 30 and the thermoelectric cooling elements 20 is shown in a simplified form in FIG. 3 of the drawing. The appliance is preferably designed so that it can be operated from either an alternating current source as for example an ordinary household power supply or from the battery of an automobile. For operation of the appliance from a high voltage A.C. source there is employed the usual power converter 26 for converting a high voltage alternating current to a low voltage direct current. The converter is adapted to be connected to a household supply circuit by means of a plug 45 connected to the converter 26 by leads 46. It will be noted with reference to FIG. 3 that both the resistance heater 32 and the thermoelectric cooling elements 20 operate from the low voltage D.C. output obtained from the output terminals 49 and 50. The energization of the thermoelectric elements 20 is controlled by means of the switch 43 while the energization of the heater 32 is controlled by the switch 42. The circuitry including the switch 42 for energizing the heater preferably also includes a switch 51 adapted to open the heater circuit whenever the heating means is in its normal or storage position disposed within the recess 35. This switch 51 of the plunger type is mounted on the rear wall 15 in such a manner that the switch is opened by movement of the heating means into its normal or recessed position and closed as the heating means is dropped to the horizontal or open position shown in FIG. 1.

In the use of an appliance of this type, it is normally contemplated that the compartment 7 will be preliminarily cooled to refrigerating temperatures by connecting the appliance to a household alternating current source through the plug 45 and that in the transportation thereof in an automobile, boat or the like provided with a low voltage D.C. current source, the thermoelectric elements will be operated from the D.C. current source. For that purpose there is provided a second pair of supply conductors 55 having on the end thereof a connector 56 adapted to be plugged into the cigarette lighter outlet of an automobile or equivalent receptacle connected to a D.C. source. The leads 55 are in turn connected to the terminals 49 and 50 of the converter 26 so that either the heater 32 or the thermoelectric elements 20 or both can be energized from the D.C. source. When it is desired to use the heating element 31, it is opened to the position shown in FIG. 1 whereby switch 51 is closed and the energization of the heating element is under the control of the switch 42. When not in use or during transportation, the heating element 31 will normally be stored within the recess 35.

While there has been shown and described a particular embodiment of the present invention it is to be understood that it is not limited thereto and it is intended to cover in the appended claims all modifications thereof falling within the scope of the invention.

What we claim as new and desire to secure by Letters Patent of the United States is:

1. A portable heating and cooling appliance comprising in combination insulated top, bottom, back and side walls defining a storage compartment having an access opening at the front thereof, an insulated door for closing said access opening, a plurality of thermoelectric elements arranged in the top, bottom and side walls to provide a plurality of cold junctions in heat exchange relationship with said compartment and a plurality of hot junctions in heat dissipating relationship with the outer surfaces of said top, bottom and side walls, a power supply compartment below said storage compartment and separated therefrom by said bottom wall, said rear wall having a recess in the outer surface thereof, an electrical heating means normally disposed in said recess and pivotally supported on said back wall and along the bottom edge thereof for movement thereof to a horizontal position, and a supply circuit comprising a first portion for energizing said heating means and a second portion for energizing said thermoelectric elements including switch means operable when said heating means is moved to its storage position in said recess for opening said first portion of said circuit.

2. A portable generally rectangular, heating and cooling appliance comprising in combination insulated top, bottom, back and side walls defining a storage compartment having an access opening at the front thereof, an insulated drop door for closing said access opening, a plurality of thermoelectric elements arranged in the top, bottom and side walls of said compartment to provide a plurality of cold junctions in heat exchange relationship with the inner surface of said compartment and a plurality of hot junctions in heat dissipating relationship with the outer surfaces of said top, bottom and side walls, a power supply compartment below said storage compartment and separated therefrom by said bottom wall, grille means provided for the circulation of air through said power supply compartment, said rear wall having a recess in the outer surface thereof of substantially the same dimensions as said access opening, an electrical heating means normally disposed in said recess and pivotally supported on said back wall and along the bottom edge thereof for movement thereof to a horizontal position, and a supply circuit comprising a first portion for energizing said elements and a second portion for energizing said heating means including switch means operable when said heating means is moved to its position in said recess for opening said second portion of said circuit.

References Cited in the file of this patent

UNITED STATES PATENTS

| | | |
|---|---|---|
| 1,885,041 | Baker | Oct. 25, 1932 |
| 2,091,292 | Scurlock | Aug. 31, 1937 |
| 2,749,716 | Lindenblad | June 12, 1956 |
| 2,991,628 | Tuck | July 11, 1961 |
| 3,040,539 | Gaugler | June 26, 1962 |